US011956531B2

(12) United States Patent
Wang et al.

(10) Patent No.: US 11,956,531 B2
(45) Date of Patent: Apr. 9, 2024

(54) VIDEO SHARING METHOD AND APPARATUS, ELECTRONIC DEVICE, AND STORAGE MEDIUM

(71) Applicant: BEIJING ZITIAO NETWORK TECHNOLOGY CO., LTD., Beijing (CN)

(72) Inventors: Xingyi Wang, Beijing (CN); Zhou Yu, Beijing (CN)

(73) Assignee: BEIJING ZITIAO NETWORK TECHNOLOGY CO., LTD. (CN)

( * ) Notice: Subject to any disclaimer, the term of this patent is extended or adjusted under 35 U.S.C. 154(b) by 0 days.

(21) Appl. No.: 18/324,235

(22) Filed: May 26, 2023

(65) Prior Publication Data

US 2023/0300452 A1 Sep. 21, 2023

Related U.S. Application Data

(63) Continuation of application No. PCT/CN2021/131454, filed on Nov. 18, 2021.

(30) Foreign Application Priority Data

Nov. 27, 2020 (CN) .......................... 202011360404.3

(51) Int. Cl.
*H04N 23/63* (2023.01)
*H04L 51/046* (2022.01)
(Continued)

(52) U.S. Cl.
CPC ......... *H04N 23/633* (2023.01); *H04L 51/046* (2013.01); *H04L 51/10* (2013.01); *H04N 5/278* (2013.01); *H04N 23/62* (2023.01)

(58) Field of Classification Search
CPC .... H04N 23/633; H04N 5/278; H04L 51/046; H04L 51/10
(Continued)

(56) References Cited

U.S. PATENT DOCUMENTS

2014/0240440 A1 8/2014 Seo et al.
2018/0131732 A1* 5/2018 Aronoff .................. H04L 65/61

FOREIGN PATENT DOCUMENTS

CN 104052935 A 9/2014
CN 104469143 A 3/2015
(Continued)

OTHER PUBLICATIONS

First Office Action dated Feb. 9, 2022 in Chinese Application No. 202011360404.3, with English translation (16 pages).
(Continued)

*Primary Examiner* — Joel W Fosselman

(57) ABSTRACT

Provided are a video sharing method and apparatus, an electronic device, and a storage medium. The method comprises: determining a designated user, and triggering a video filming instruction for the designated user; displaying a filming interface in response to receipt of the video filming instruction; initiating video filming in response to receipt of an initiate instruction, and in response to determining that voice information is received, adding the voice information in the form of a subtitle to the filming interface to obtain a filmed video; and sharing the filmed video with the designated user through a conversation message.

14 Claims, 17 Drawing Sheets

(51) Int. Cl.
*H04L 51/10* (2022.01)
*H04N 5/278* (2006.01)
*H04N 23/62* (2023.01)

(58) Field of Classification Search
USPC .................................................. 348/333.02
See application file for complete search history.

(56) References Cited

FOREIGN PATENT DOCUMENTS

| | | | |
|---|---|---|---|
| CN | 106851401 A | | 6/2017 |
| CN | 106888155 A | | 6/2017 |
| CN | 108063722 A | | 5/2018 |
| CN | 110300274 A | | 10/2019 |
| CN | 110703971 A | | 1/2020 |
| CN | 111147948 | * | 5/2020 |
| CN | 111147948 A | | 5/2020 |
| CN | 112533052 A | | 3/2021 |

OTHER PUBLICATIONS

Second Office Action dated Apr. 20, 2022 in Chinese Application No. 202011360404.3, with English translation (17 pages).
Notice of Rejection dated Jun. 29, 2022 in Chinese Application No. 202011360404.3, with English translation (17 pages).
International Search Report dated Feb. 10, 2022 in PCT/CN2021/131454, with English translation (5 pages).
How to Record and Share Videos on WeChat, Mar. 30, 2018, available at coozhi.com (9 pages).

* cited by examiner

VIDEO SHARING METHOD AND APPARATUS, ELECTRONIC DEVICE, AND STORAGE MEDIUM

CROSS REFERENCE TO RELATED APPLICATIONS

This is a Continuation Application of International Patent Application No. PCT/CN2021/131454, filed Nov. 18, 2021, which claims priority to Chinese Patent Application No. 202011360404.3 filed Nov. 27, 2020, the disclosures of which are incorporated herein by reference in their entireties.

TECHNICAL FIELD

Embodiments of the present disclosure relate to the field of data processing technology and in particular, to a video sharing method and apparatus, an electronic device, and a storage medium.

BACKGROUND

Instant Messenger (IM) is a communication service based on the Internet, and generally, is mainly used for achieving an instant messaging function over networks. At present, in the instant messaging service, a user can communicate instantly by sending words or pictures or can communicate instantly by sharing short videos filmed using a camera.

However, in the process of instant communication by filming short videos, a very complicated operation process is usually required to complete the whole short video filming and sharing process. Therefore, the operation steps become cumbersome, reducing the experience of the user.

SUMMARY

Embodiments of the present disclosure provide a video sharing method and apparatus, an electronic device, and a storage medium to achieve the simple filming and sharing of short videos in the instant messaging process.

In a first aspect, the embodiments of the present disclosure provide a video sharing method. The method includes the following steps.

A designated user is determined, and a video filming instruction is triggered for the designated user.

A filming interface is displayed in response to the receipt of the video filming instruction.

Video filming is initiated in response to the receipt of an initiate instruction, and in response to determining that voice information is received, the voice information is added in the form of a subtitle to the filming interface to obtain a filmed video, where the initiate instruction includes a long press operation or voice information.

The filmed video is shared with the designated user through a conversation message.

In a second aspect, the embodiments of the present disclosure further provide a video sharing apparatus. The apparatus includes a designated user video filming instruction triggering module, a filming interface displaying module, a filmed video acquiring module, and a filmed video sending module.

The designated user video filming instruction triggering module is configured to determine a designated user and trigger a video filming instruction for the designated user.

The filming interface displaying module is configured to display a filming interface in response to the receipt of the video filming instruction.

The filmed video acquiring module is configured to initiate video filming in response to the receipt of an initiate instruction, and in response to determining that voice information is received, add the voice information in the form of a subtitle to the filming interface to obtain a filmed video, where the initiate instruction includes a long press operation or voice information.

The filmed video sending module is configured to share the filmed video with the designated user through a conversation message.

In a third aspect, the embodiments of the present disclosure further provide an electronic device. The electronic device includes at least one processor and a storage apparatus.

The storage apparatus is configured to store at least one program.

The at least one program, when executed by the at least one processor, enables the at least one processor to perform the method of any embodiment of the present disclosure.

In a fourth aspect, the embodiments of the present disclosure further provide a non-transitory computer-readable storage medium storing a computer program, where the computer program, when executed by a processor, performs the method of any embodiment of the present disclosure.

DETAILED DESCRIPTION

Figure 1A:
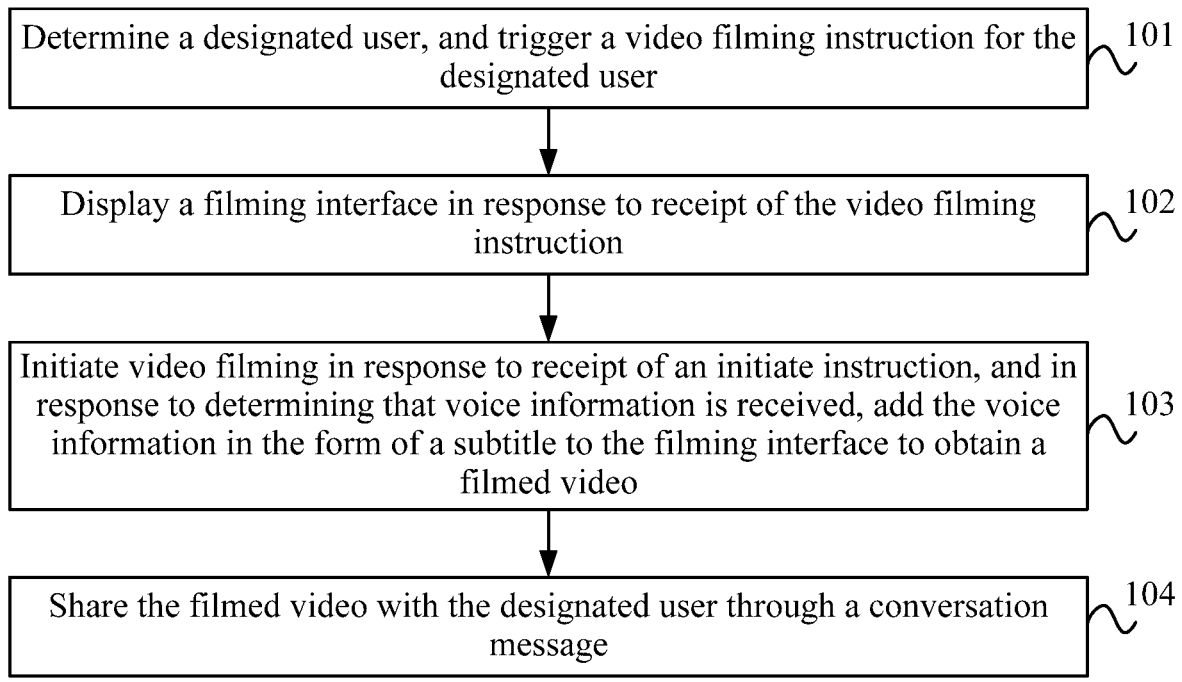
FIG. 1(a) is a flowchart of a video sharing method according to embodiment one of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure will be thoroughly and completely understood. It is to be understood that drawings and embodiments of the present disclosure are illustrative and are not intended to limit the scope of the present disclosure.

It is to be understood that various steps recited in the method embodiments of the present disclosure may be performed in a different order, and/or in parallel. In addition, the method embodiments may include additional steps and/or omit steps performed or illustrated herein. The scope of the present disclosure is not limited in this respect.

As used herein, the term "include" and variations thereof are intended to be open-ended terms, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms are given in the description below.

It is to be noted that references to "first", "second" and the like in the present disclosure are intended to distinguish one from another apparatus, module or unit and are not intended to limit the order or interrelationship of the functions performed by the apparatus, module or unit.

It is to be noted that references to modifications of "one" or "a plurality" mentioned in the present disclosure are intended to be illustrative and not limiting; those skilled in the art should understand that "one" or "a plurality" should be understood as "at least one" unless clearly expressed in the context.

The names of messages or information exchanged between multiple apparatuses in embodiments of the present disclosure are for illustrative purposes and are not intended to limit the scope of such messages or information.

Embodiment One

FIG. 1(a) is a flowchart of a video sharing method according to this embodiment of the present disclosure. This embodiment is applicable to the simple filming and sharing of short videos in the instant messaging process. The method can be performed by a video sharing apparatus provided by embodiments of the present disclosure, and the apparatus can be implemented in software and/or hardware and may generally be integrated into a computer device. The method in this embodiment of the present disclosure is as follows.

Optionally, as shown in FIG. 1(a), the method in this embodiment of the present disclosure may include steps 101 to 104.

In step 101, a designated user is determined, and a video filming instruction is triggered for the designated user.

Optionally, the step where the designated user is determined and the video filming instruction is triggered for the designated user may include one of the following steps: in response to detecting a click operation of a user on a chat list interface for a filming identification of the designated user, the video filming instruction is triggered, where the chat list interface includes at least one user, and each user corresponds to one filming identification, respectively; in response to detecting a click operation of a user on a conversation interface with the designated user for a filming identification, the video filming instruction is triggered; or in response to detecting an up-sliding operation of a user on a conversation interface with the designated user, the video filming instruction is triggered, where the sliding distance of the up-sliding operation exceeds a distance threshold.

In this embodiment, the step where the designated user is determined and the video filming instruction is triggered for the designated user is performed in various manners described below.

Figure 1B:
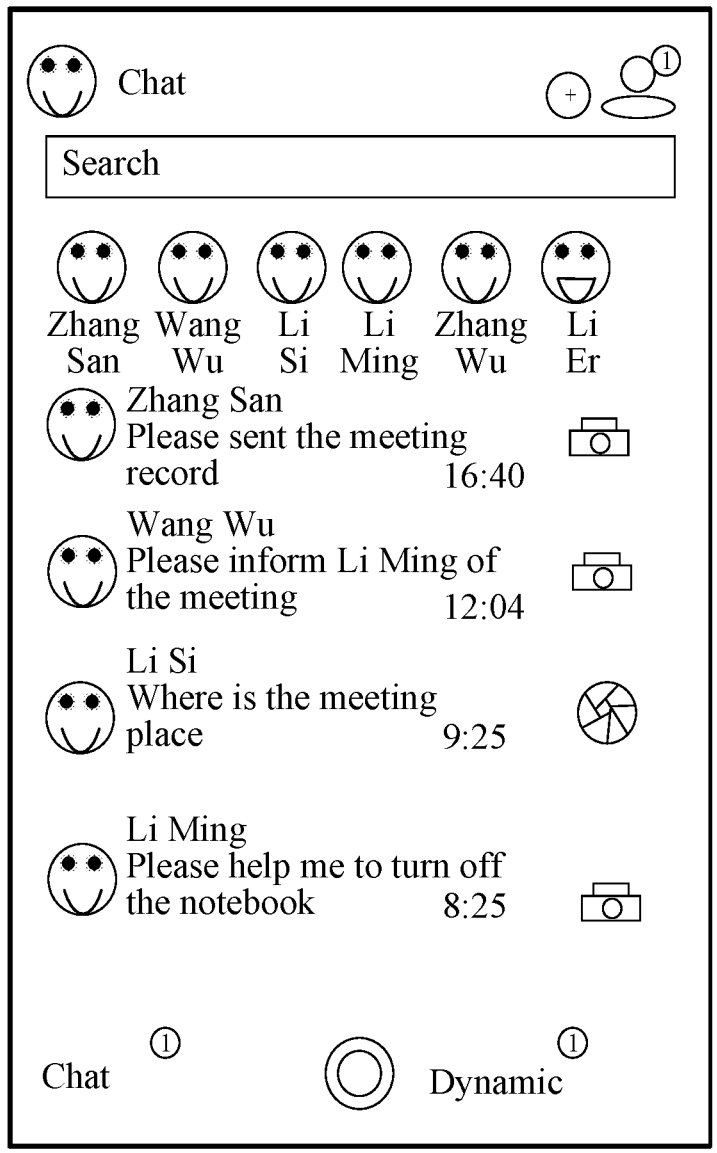
FIG. 1(b) is a schematic diagram of a chat list interface according to embodiment one of the present disclosure.

First manner: As shown in FIG. 1(b) which is a schematic diagram of a chat list interface, since at least one user is included on the chat list interface, the ranking order of the users on the chat list interface may be determined according to the historical chat time, and the closer the chat time is to the current time, the higher the ranking of the corresponding users. Each user corresponds to one filming identification, respectively. For example, the filming identification may be a camera icon or other icons arranged on the right side of a user avatar identification. The type of the filming identification is not limited in this embodiment. In response to determining that a click operation of a user on the filming identification corresponding to the designated user on the chat list interface is detected, the video filming instruction may be triggered.

Figure 1C:
FIG. 1(c) is a schematic diagram of a conversation interface with a designated user according to embodiment one of the present disclosure.

Second manner: As shown in FIG. 1(c) which is a schematic diagram of a conversation interface with the designated user, in the process of chatting with the designated user Zhang San through the conversation interface, if the user wants to film a short video and send it to the designated user, the user may click the filming identification in the lower left corner of the interface, for example, the camera icon in the lower left corner. In response to determining that a click operation of the user on the filming identification on the conversation interface with the designated user is detected, the video filming instruction may also be triggered.

Figure 1D:
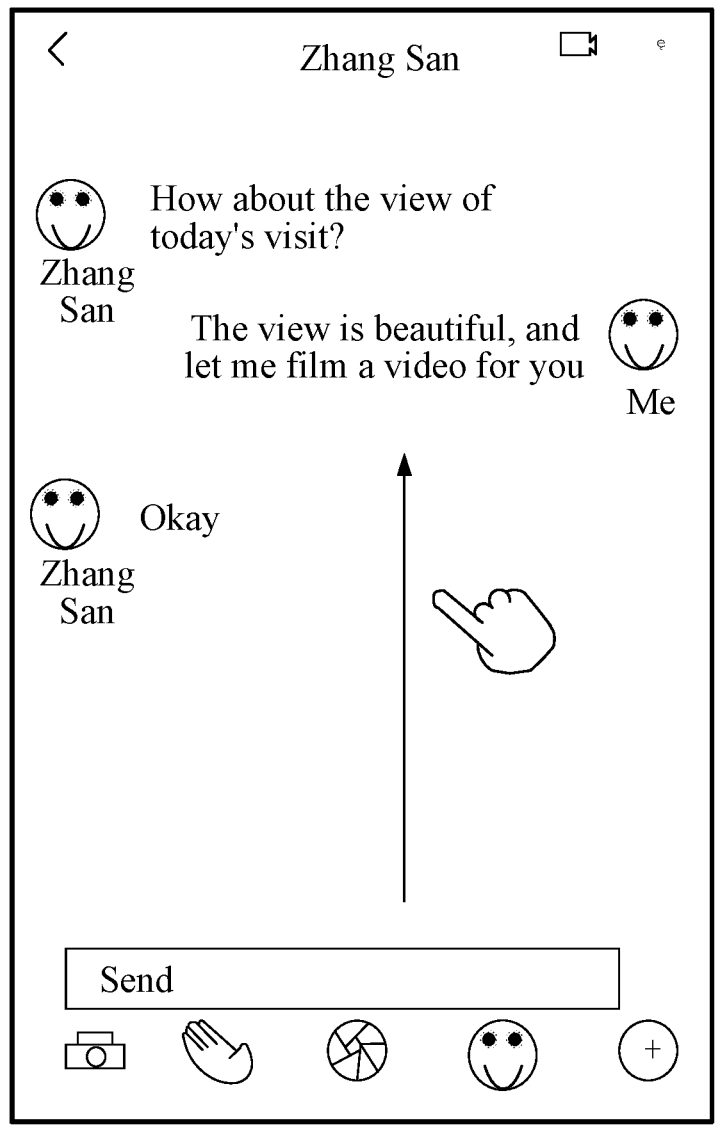
FIG. 1(d) is an indication diagram of a video filming instruction triggered by up-sliding on the conversation interface according to embodiment one of the present disclosure.

Third manner: As shown in FIG. 1(d) which is an indication diagram of a video filming instruction triggered by up-sliding on the conversation interface, on the conversation interface with the designated user, the user may also wake up the camera through a gesture up-sliding operation. In response to determining that the gesture up-sliding operation of the user on the conversation interface is detected and that the sliding distance of the up-sliding operation exceeds the distance threshold, a vibration effect is generated, and the video filming instruction is triggered. Of course, the above three manners are illustrative in this embodiment, and the operation manner in which the video filming instruction is triggered for the designated user is not limited in the practical application.

In step 102, a filming interface is displayed in response to the receipt of the video filming instruction.

It is to be noted that this embodiment is mainly applied to the field of instant messaging, and the video involved therein mainly refers to a short video whose video duration is shorter than a preset duration, where the preset duration is generally short, for example, the preset duration in this embodiment is set to 30 seconds. In the process of social communication based on instant messaging, users usually have the needs to share and watch short videos with other users, and short videos can satisfy the needs of users to share and watch videos without wasting too many network resources.

Figure 1E:
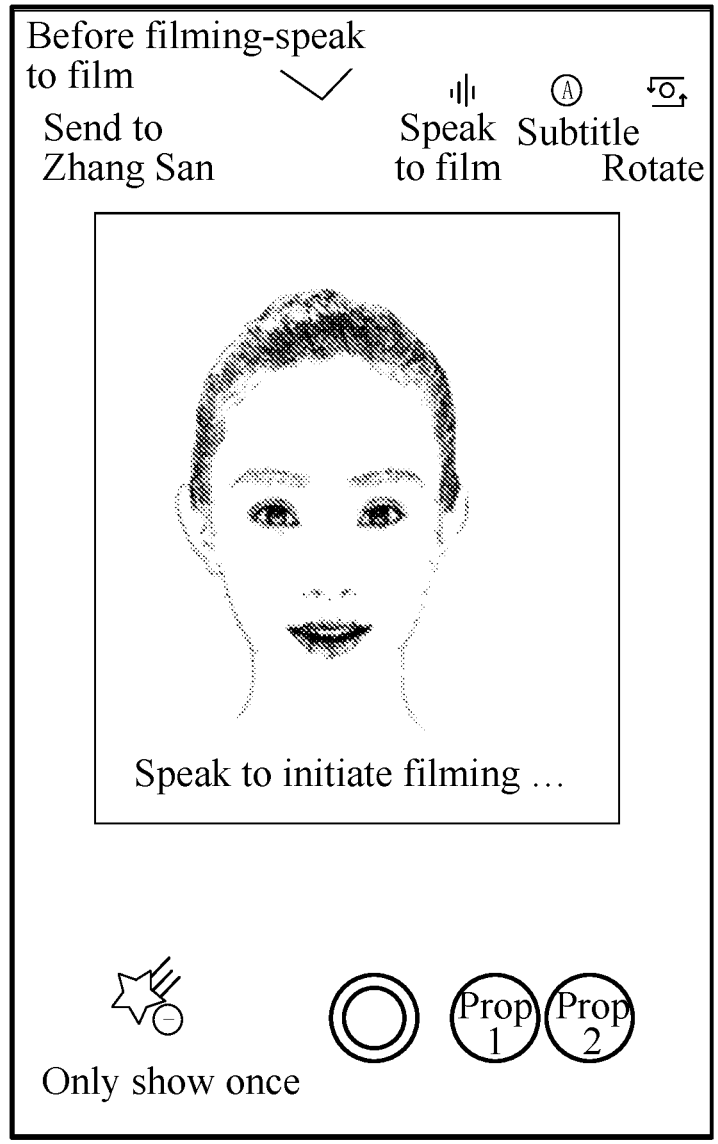
FIG. 1(e) is a schematic diagram of a filming interface where a speak-to-film control key is on according to embodiment one of the present disclosure.
Figure 1F:
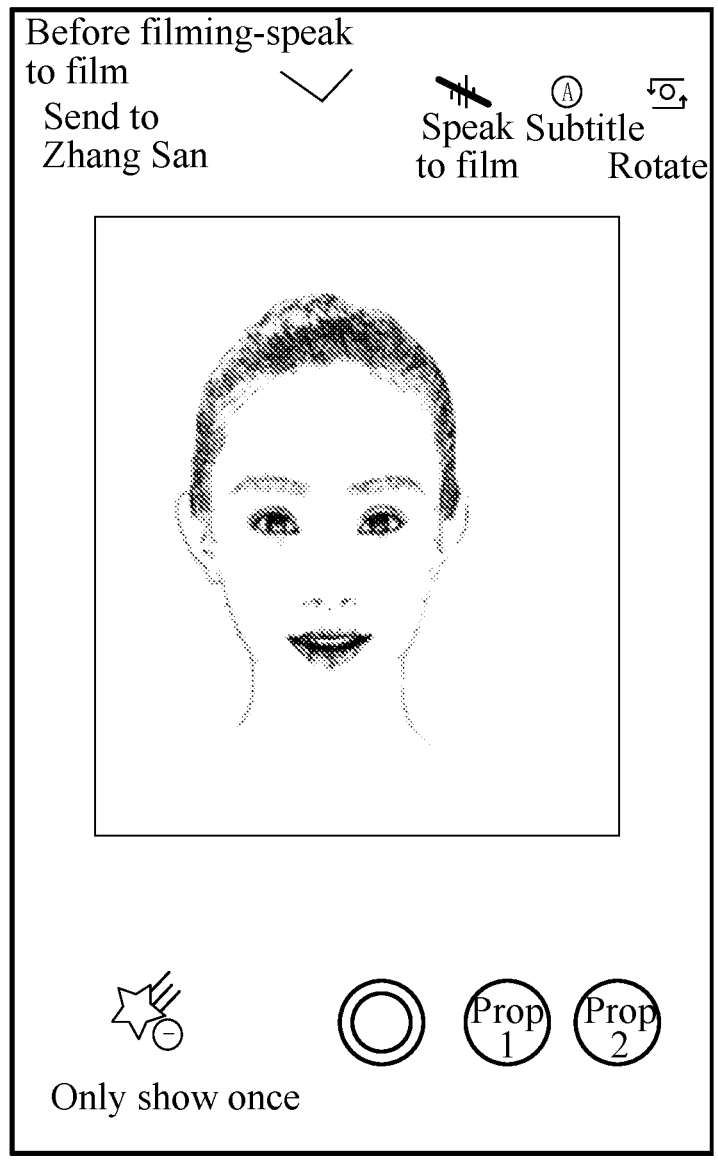
FIG. 1(f) is a schematic diagram of a filming interface where a speak-to-film control key is off according to embodiment one of the present disclosure.

For example, a filming interface is displayed in response to determining that the video filming instruction is received, as shown in FIGS. 1(f) to 1(e) which are schematic diagrams of a filming interface in this embodiment. The filming interface includes a framing area, a filming control area, and a filming menu area. The framing area displays a scene to be filmed according to a specified adaptation ratio. The filming menu area includes a speak-to-film control key, a subtitle control key, and a flip control key. The filming control area includes a filming control key, an only-show-once control key, and a trial prop. FIG. 1(e) is a schematic diagram of a filming interface where the speak-to-film control key is on, and FIG. 1(f) is a schematic diagram of a filming interface where the speak-to-film control key is off.

For the framing area, the framing area in this embodiment displays the scene to be filmed according to a designated ratio, where the ratio, for example, may be 3:4 and, of course, may be other ratios defined by users according to the actual needs. As can be seen from the figure, the framing area in this embodiment does not occupy the entire screen but occupies a part of the screen. In this manner, even when the user takes a selfie, the face can appear smaller, thereby improving the aesthetics of video filming and improving the satisfaction of the user.

For the filming menu area, the speak-to-film control key is the on state by default, and the previous one state is not remembered. The user can turn off the speak-to-film control key according to the filming requirements. In a case where the speak-to-film control key is on, the user may initiate filming by speaking, that is, through voice information, or may initiate filming by long pressing the filming control key in the filming control area. In a case where the speak-to-film control key is off, the user can initiate filming only by speaking, that is, through voice information. In a case where the speak-to-film control key is on, a pre-filming copy is displayed in the framing area, for example, "Speak to start filming". In a case where the speak-to-film control key is off, the pre-filming copy is not displayed in the framing area. In addition, the subtitle control key is the on state by default, and the previous one state is not remembered. The user can turn off the subtitle control key according to the filming requirements. Whether or not the subtitle control key is off, if the voice information is recognized in the filming process, the voice information is recognized. In a case where the subtitle control key is on, the recognized text is displayed in the framing area in the form of a subtitle, and in a case where the subtitle control key is off, the recognized text is saved and not displayed in the framing area.

For the filming control area, the user may select the on/off state of the only-show-once control key according to the actual demand. In a case where the only-show-once control key is on, a filmed video is sent to the designated user, the designated user can only watch the filmed video once, and then the filmed video is withdrawn after the filmed video has been watched once. In a case where the only-show-once control key is off, the filmed video is sent to the designated user, and the designated user can repeatedly watch the video multiple times, where the number of times the designated user can watch the video is not restricted. A horizontal sliding trial prop may be additionally provided in the filming control area, different props may be selected by sliding left and right, and a corresponding special effect may be added to the filmed video according to the selection of the prop by the user.

In step 103, video filming is initiated in response to the receipt of an initiate instruction, and in response to determining that voice information is received, the voice information is added in the form of a subtitle to the filming interface to obtain a filmed video.

The initiate instruction includes a long press operation or voice information.

Optionally, the step where video filming is initiated in response to the receipt of the initiate instruction and in response to determining that the voice information is received, the voice information is added in the form of a subtitle to the filming interface to obtain the filmed video may include the following steps: in response to determining that the speak-to-film control key is on and that the voice information is received, filming is initiated, and a filming progress bar is displayed on the filming interface, where the filming progress bar is used for performing a countdown on a filming duration based on a preset duration; text recognition is performed on the voice information, and in response to determining that the subtitle control key is on, text corresponding to the voice information is displayed in the form of a subtitle on the filming interface in real time; and in response to determining that the voice information is not received within a preset time range or that the filming duration reaches the preset duration, filming is stopped to obtain the filmed video.

Optionally, the step where video filming is initiated in response to the receipt of the initiate instruction and in response to determining that the voice information is received, the voice information is added in the form of a subtitle to the filming interface to obtain the filmed video may include the following steps: in response to determining that a long press operation of a user on the filming control key is received, filming is initiated, and a filming progress bar is displayed on the filming interface, where the filming progress bar is used for performing a countdown on a filming duration based on a preset duration; in response to determining that the voice information is received during the long press operation, text recognition is performed on the voice information, and in response to determining that the subtitle control key is on, text corresponding to the voice information is displayed in the form of a subtitle on the filming interface in real time; and in response to determining that the long press operation of the user on the filming control key ends or that the filming duration reaches the preset duration, filming is stopped to obtain the filmed video.

For example, in this embodiment, the filming may be initiated through voice information or may also be initiated through a long press operation on the filming control key. The long press operation means that the time for pressing the filming control key exceeds a specified duration. For example, the specified duration is set to 1 second, that is, when the time for pressing the filming control key exceeds 1 second, the filming is initiated through the long press operation.

It is to be noted that whether the filming is initiated through the voice message or the long press operation, in response to determining that the voice information is received, the voice information is recognized, the recognized text is displayed in the framing area in the form of a subtitle in a case where the subtitle control key is on, and the recognized text is saved and not displayed in the framing area in a case where the subtitle control key is off.

In step 104, the filmed video is shared with the designated user through a conversation message.

Optionally, the step where the filmed video is shared with the designated user through the conversation message may include the following steps: in response to determining that the duration of the filmed video does not exceed the preset duration and that a sending instruction is received, the filmed video is sent to the designated user through the conversation message for sharing; and in response to determining that the duration of the filmed video exceeds the preset duration, the filmed video is automatically sent to the designated user through the conversation message for sharing.

Optionally, the sending instruction is generated when a user clicks a sending key or is generated when a user releases the filming control key.

For example, in this embodiment, whether the filming is initiated through the voice message or the long press operation, the filmed video is automatically sent or actively sent. For example, when the preset duration is determined to be 30 seconds, if the filming duration exceeds 30 seconds, the filmed video is automatically sent to the designated user for sharing, and if the filming duration does not exceed the preset duration, for example, when the filming is performed for 15 seconds, the filmed video may be sent to the designated user for sharing according to the received sending instruction.

Figure 1G:
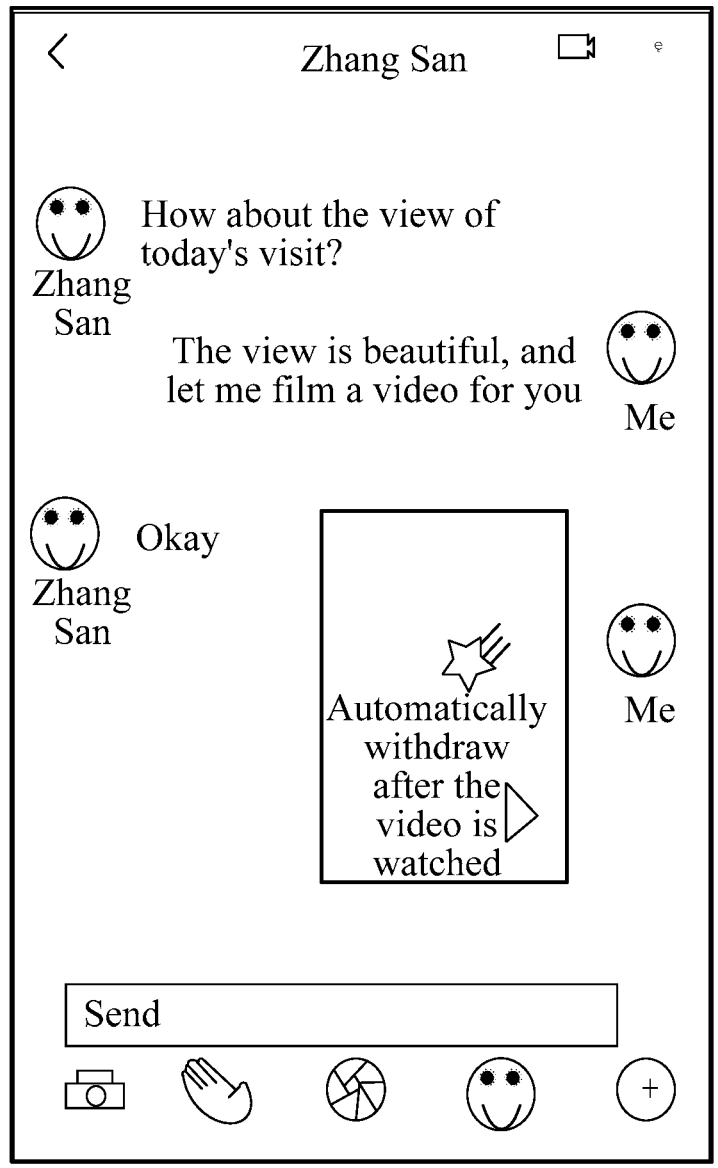
FIG. 1(g) is a schematic diagram of a chat interface after a playback video is shared according to embodiment one of the present disclosure.
Figure 1H:
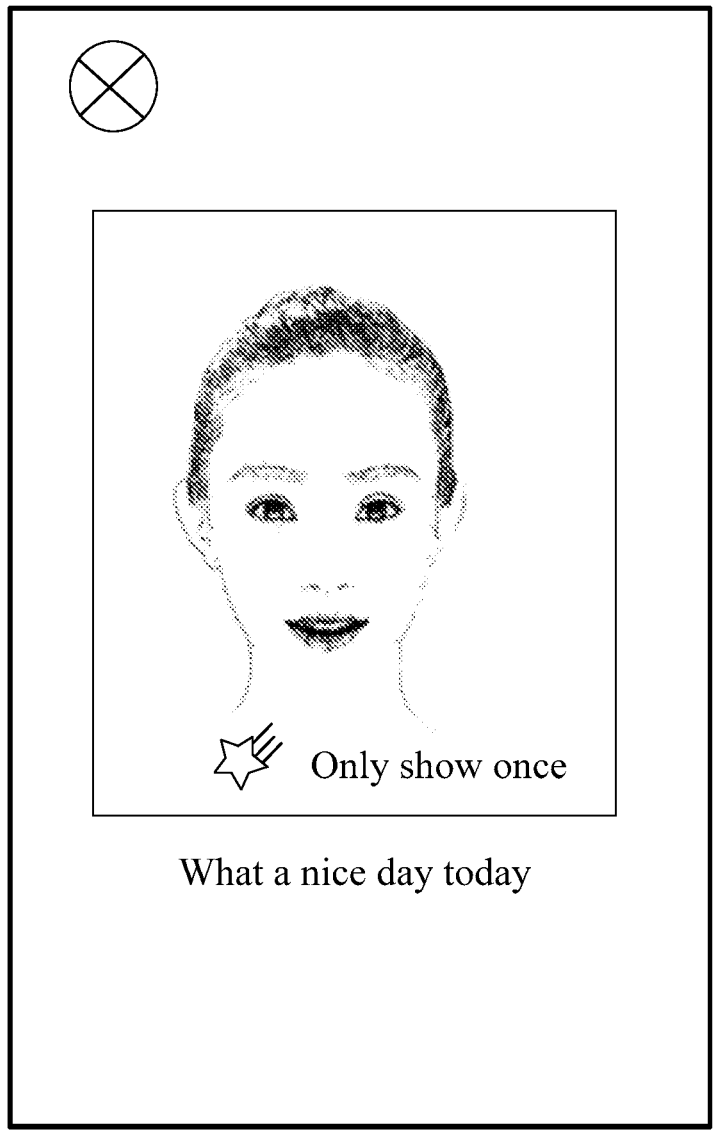
FIG. 1(h) is a schematic diagram of a video playback detail interface according to embodiment one of the present disclosure.

As shown in FIG. 1(g) which is a schematic diagram of a chat interface after a playback video is shared, since the user turns on the only-show-once control key on the filming interface, the video sent to the designated user Zhang San is marked with an identification "Video will be automatically withdrawn after being watched". Both the video sender and the video receiver can play the video by clicking on the video on the chat interface. As shown in FIG. 1(h) which is a schematic diagram of a video playback detail interface, since the user turns on the subtitle control key, the voice information collected in the filming process is displayed under the video in the form of a subtitle. For example, the subtitle is "What a nice day today" and is displayed in the center.

In this embodiment of the present disclosure, the video filming can be initiated directly through the long press operation or the trigger of voice information, the collected voice information is automatically added to the video in the form of a subtitle in the filming process, and the filmed video is shared with the designated user through the conversation message. In this manner, the filming and sharing process of the short video becomes simple to operate, the filmed video has better performance, and the user can quickly and effectively complete the sharing process of the filmed video, thereby greatly improving the experience of the user.

Embodiment Two

Figure 2A:
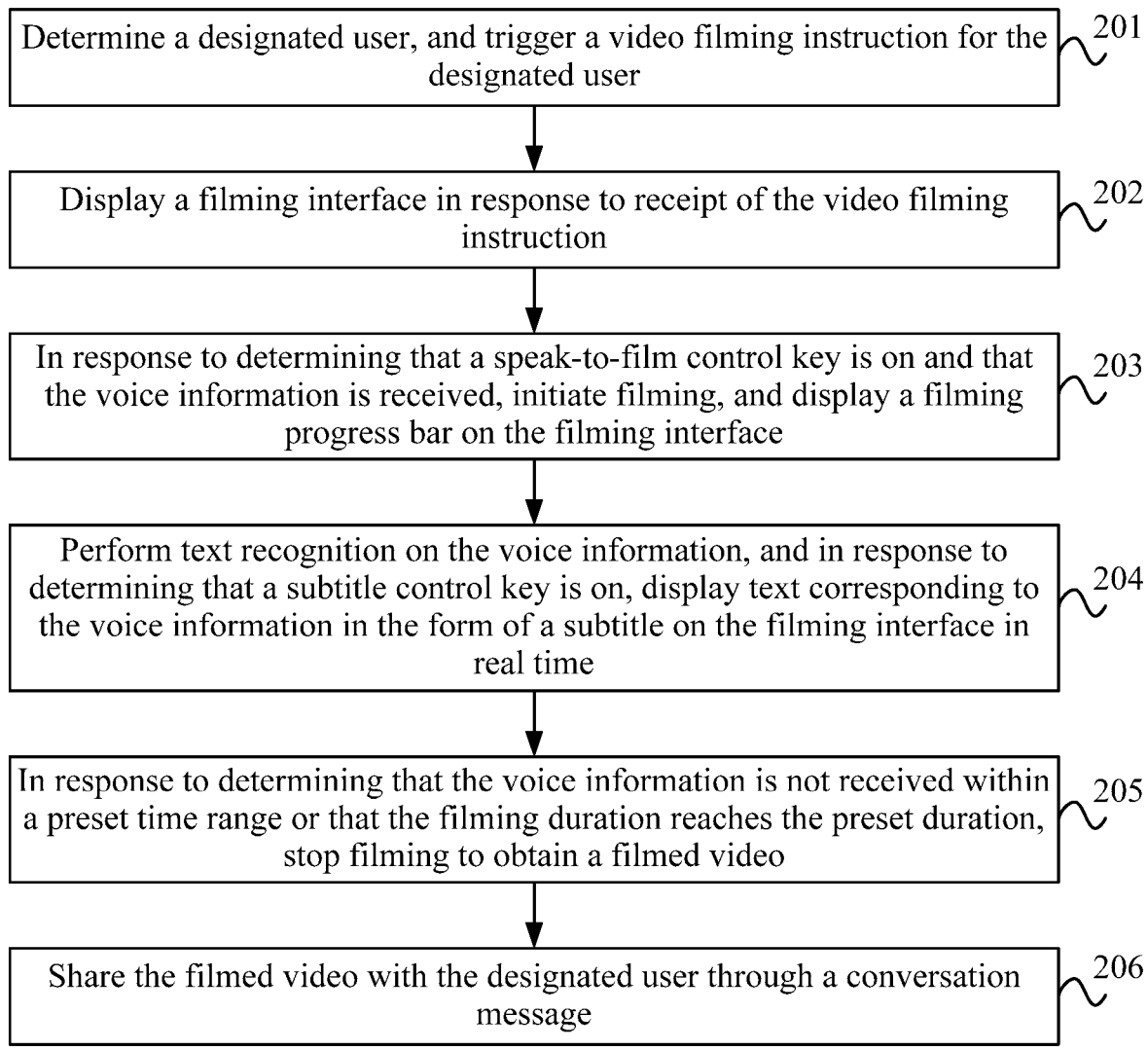
FIG. 2(a) is a flowchart of a video sharing method according to embodiment two of the present disclosure.

FIG. 2(a) is a flowchart of a video sharing method according to this embodiment of the present disclosure. This embodiment of the present disclosure may be combined with various optional schemes in the above embodiment. The filming process of embodiment one when the initiate instruction is voice information is described below in this embodiment of the present disclosure.

As shown in FIG. 2(a), the method in this embodiment of the present disclosure includes steps 201 to 206.

In step 201, a designated user is determined, and a video filming instruction is triggered for the designated user.

In step 202, a filming interface is displayed in response to the receipt of the video filming instruction.

In step 203, in response to determining that a speak-to-film control key is on and that the voice information is received, filming is initiated, and a filming progress bar is displayed on the filming interface.

The filming progress bar is used for performing a countdown on a filming duration based on a preset duration.

Figure 2B:
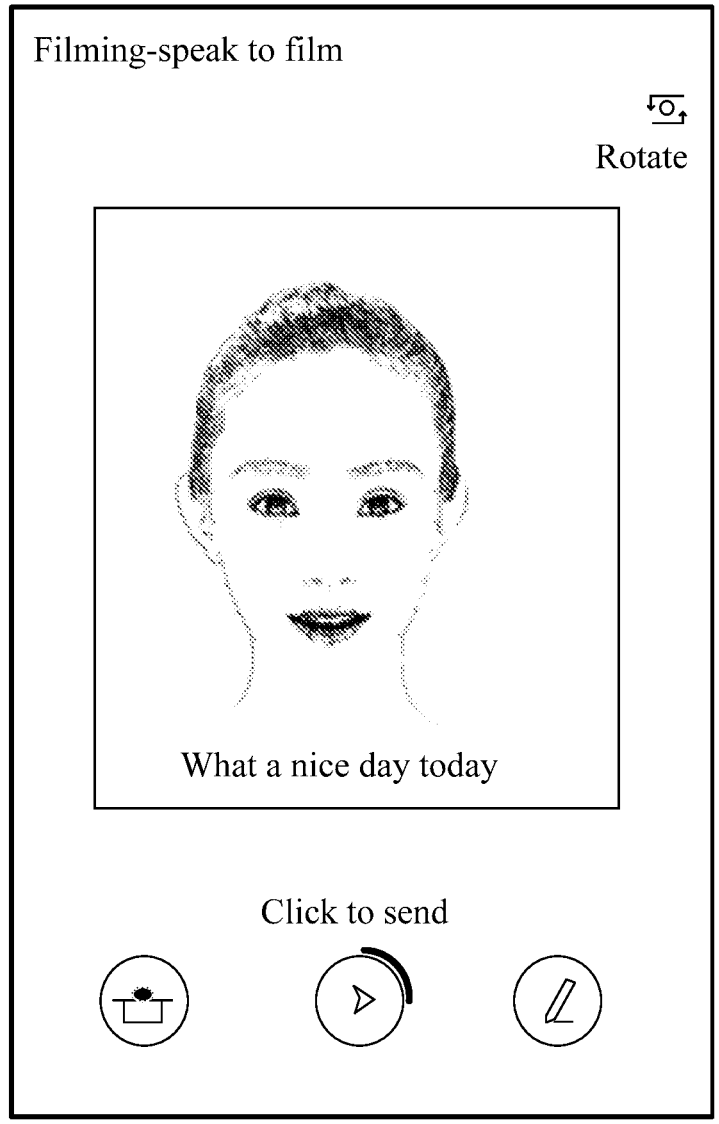
FIG. 2(b) is a schematic diagram of an interface in a speak-to-film filming process according to embodiment two of the present disclosure.

For example, as shown in FIG. 2(b) which is a schematic diagram of an interface in a speak-to-film filming process, when the filming is initiated through speak-to-film voice information, the receipt of a turn-on instruction of the user for the speak-to-film control key needs to be confirmed before the filming is initiated, that is, the speak-to-film control key is required to be in the on state. In response to determining that the speak-to-film control key is on, the filming is initiated, and the filming progress bar displayed on the filming interface performs a countdown on the filming duration based on the preset duration. The color of the filming progress bar may be continuously changed according to the ratio of the current filming duration to the preset duration. When the filming duration is close to the preset duration, for example, when the preset duration is reached in 5 seconds, the remaining filming duration is displayed to achieve the effect of prompting the user. The filming progress bar in this embodiment, for example, may be displayed in the filming control area on the filming interface. Of course, the filming progress bar in this embodiment is illustrative, and the display location of the filming progress bar on the filming interface is not limited herein.

In step 204, text recognition is performed on the voice information, and in response to determining that a subtitle control key is on, text corresponding to the voice information is displayed in the form of a subtitle on the filming interface in real time.

For example, after the filming is initiated through the voice information, in response to determining that the subtitle control key is on, the voice information is recognized, and the recognized text is displayed in the form of a subtitle on the filming interface in real time. The display location of the subtitle is fixed at the bottom of the video. The subtitle is set with a maximum width and the maximum number of lines. For example, the maximum number of lines may be set to two, the maximum width is 10 words per line, and when the maximum width and the maximum number of lines are reached, the subtitle generation continues from the next sentence.

It is to be noted that in a case where the subtitle control key is off before filming, the voice information still needs to be recognized in response to determining that the voice information is received, but the recognized text is not displayed in the form of a subtitle but is saved. When the video is edited after filming, if the turn-on instruction of the user for the subtitle control key is received, the recognition result, that is, the recognized text, is displayed as a whole, instead of being displayed word by word as in the filming process. In this embodiment, the subtitle control key can be turned off or turned on before and after the filming, but the state of the subtitle control key cannot be modified during the filming.

In the speech recognition process, when the text cannot be recognized due to a failure of a network or a device, an alarm prompt, for example, "No subtitle is recognized", is displayed on the filming interface so that the user can timely overhaul the network or the device.

In step 205, in response to determining that the voice information is not received within a preset time range or that the filming duration reaches the preset duration, filming is stopped to obtain a filmed video.

For example, after the filming is initiated through the voice information, if the voice information is not received within a preset time in the filming process, for example, if the voice information is not received within 2 seconds, or if the filming duration reaches a preset duration, for example, if the filming duration exceeds the preset duration of 30 seconds, the filming is stopped to obtain a filmed video.

Optionally, after the filming is initiated in response to determining that the speak-to-film control key is on and that the voice information is received and the filming progress bar is displayed on the filming interface, the method further includes the following steps: a filming delete key and an edit key are displayed on the filming interface; in response to detecting a click operation of the user on the filming delete key, a current filmed video is deleted, and return to the filming interface; in response to detecting a click operation of the user on the edit key, the current filmed video is displayed on an editing interface; and in response to detecting a distance scaling operation of two fingers of the user in the framing area, zooming processing is performed on the current filmed video.

It is to be noted that after the filming progress bar is displayed in the filming control area, the filming delete key is also displayed in the filming control area, such as the icon on the left of the filming control key in FIG. 2(b), and the edit key is also displayed, such as the icon on the right of the filming control key in FIG. 2(b). In response to detecting a click operation of the user on the filming delete key before the filming progress bar is completely filled, the current filmed video is deleted, and return to the filming interface shown in FIG. 1(e) for re-filming. In response to detecting a click operation of the user on the edit key, the current filmed video is displayed on the editing interface, indicating that the user needs to edit the current filmed video. In response to detecting a distance scaling operation of two fingers of the user in the framing area, the zooming processing is performed on the current filmed video. For example, in response to determining that the distance between two fingers becomes larger, the filmed video is zoomed in, and in response to determining that the distance between two fingers becomes smaller, the filmed video is zoomed out.

In step 206, the filmed video is shared with the designated user through a conversation message.

It is to be noted that in the speak-to-film filming process, the filmed video may be sent in various manners. In the filming process, a control key on the filming interface may be used as a sending key. In response to determining that the duration of the filmed video does not exceed the preset duration, for example, if the duration of the filmed video is 15 seconds while the preset duration is 30 seconds, when a click operation of the user on the sending key is detected, a sending instruction is triggered, and the filmed video is sent to the designated user for sharing, that is, the filmed video is sent manually. In response to determining that the duration of the filmed video exceeds the preset duration, the filmed video with a duration of 30 seconds is automatically sent to the designated user. The sending manner is not limited in this embodiment. In this embodiment of the present disclosure, the video filming can be initiated directly through the trigger of the voice information, the collected voice information is automatically added to the video in the form of a subtitle in the filming process, and the filmed video is shared with the designated user through the conversation message. In this manner, the filming and sharing process of the short video becomes simple to operate, the filmed video has better performance, and the user can quickly and effectively complete the sharing process of the filmed video, thereby greatly improving the experience of the user.

Embodiment Three

Figure 3A:
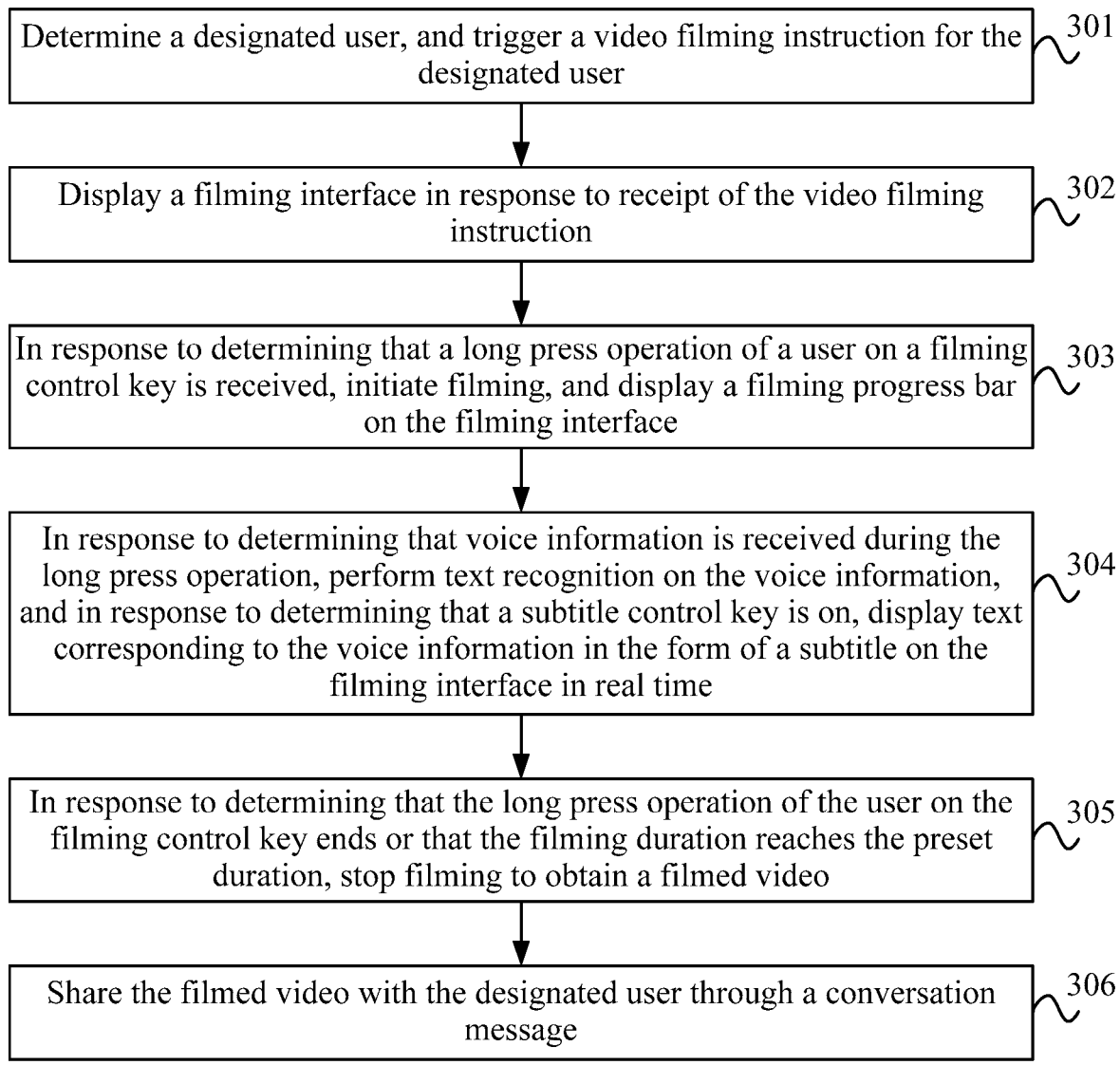
FIG. 3(a) is a flowchart of a video sharing method according to embodiment three of the present disclosure.

FIG. 3(a) is a flowchart of a video sharing method according to this embodiment of the present disclosure. This embodiment of the present disclosure may be combined with various optional schemes in the above embodiments. The filming process of embodiment one when the initiate instruction is a long press operation is described below in this embodiment of the present disclosure.

As shown in FIG. 3(a), the method in this embodiment of the present disclosure includes steps 301 to 306.

In step 301, a designated user is determined, and a video filming instruction is triggered for the designated user.

In step 302, a filming interface is displayed in response to the receipt of the video filming instruction.

In step 303, in response to determining that a long press operation of a user on a filming control key is received, filming is initiated, and a filming progress bar is displayed on the filming interface.

The filming progress bar is used for performing a countdown on a filming duration based on a preset duration.

Figure 3B:
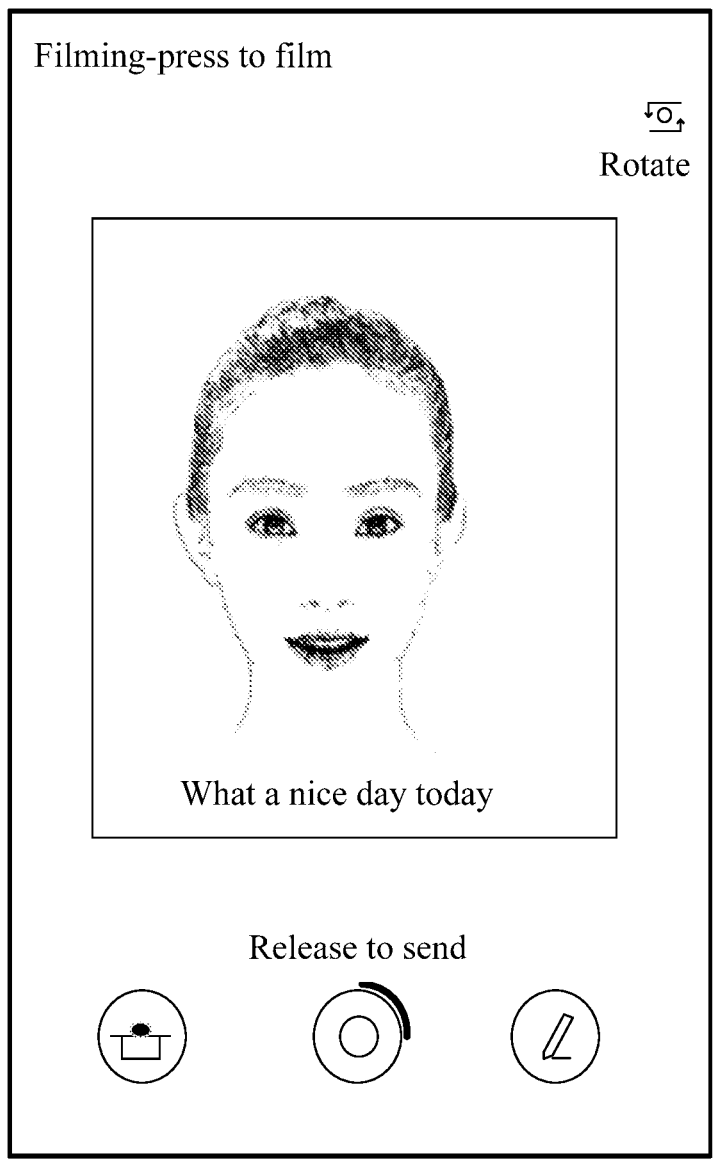
FIG. 3(b) is a schematic diagram of an interface in a press-to-film filming process according to embodiment three of the present disclosure.

For example, as shown in FIG. 3(b) which is a schematic diagram of an interface in a press-to-film filming process, when the filming is initiated through the long press operation, the on/off state of the speak-to-film control key is not defined before the filming is initiated, that is, when the speak-to-film control key is off, the filming is initiated only through the long press operation, and when the speak-to-film control key is on, the user can still initiate the filming through the long press operation. In the process where the user long presses the filming control key for filming, the filming progress bar displayed on the filming interface performs a countdown on the filming duration based on the preset duration. The color of the filming progress bar may be continuously changed according to the ratio of the current filming duration to the preset duration. In the process where the user presses the filming control key for filming, the copy of "Release to send" is displayed at the edge of the filming progress bar, and when the filming duration is close to the preset duration, for example, if the preset duration is reached in 5 seconds, the copy of "Release to send" is changed to "Send in 5 seconds", and the countdown continues every second.

In step 304, in response to determining that voice information is received during the long press operation, text recognition is performed on the voice information, and in response to determining that a subtitle control key is on, text corresponding to the voice information is displayed in the form of a subtitle on the filming interface in real time.

For example, in the process where the filming is initiated through the long press operation, in response to determining that the voice information is received and that the subtitle control key is on, the voice information is recognized, and the recognized text is displayed in the form of a subtitle on the filming interface in real time. The display location of the subtitle is fixed at the bottom of the video. The subtitle is set with a maximum width and the maximum number of lines. For example, the maximum number of lines may be set to two, the maximum width is 10 words per line, and when the maximum width and the maximum number of lines are reached, the subtitle generation continues from the next sentence.

It is to be noted that in a case where the subtitle control key is off before filming, the voice information still needs to be recognized in response to determining that the voice information is received, but the recognized text is not displayed in the form of a subtitle but is saved. When the video is edited after filming, if the turn-on instruction of the user for the subtitle control key is received, the recognition result, that is, the recognized text, is displayed as a whole, instead of being displayed word by word as in the filming process. In this embodiment, the subtitle control key can be turned off or turned on before and after the filming, but the state of the subtitle control key cannot be modified during the filming.

In step 305, in response to determining that the long press operation of the user on the filming control key ends or that the filming duration reaches the preset duration, filming is stopped to obtain a filmed video.

For example, after the filming is initiated through the long press operation, if the long press operation ends within a preset time in the filming process, for example, if the filming control key is no longer pressed, or if the filming duration reaches a preset duration, for example, if the filming duration exceeds the preset duration of 30 seconds, the filming is stopped to obtain a filmed video.

Optionally, after the filming is initiated in response to determining that the long press operation of the user on the filming control key is received and the filming progress bar is displayed on the filming interface, the method further includes the following steps: a filming delete key and an edit key are displayed on the filming interface; in response to detecting that the user performs a press-slide operation from the filming control key to the filming delete key and stops the press operation at the location of the filming delete key, a current filmed video is deleted, and return to the filming interface; in response to detecting that the user performs a press-slide operation from the filming control key to the edit key and stops the press operation at the location of the edit key, the current filmed video is displayed on an editing interface; and in response to detecting that the user performs a press-slide operation from the filming control key to the framing area, zooming processing is performed on the current filmed video.

It is to be noted that after the filming progress bar is displayed in the filming control area, the filming delete key is also displayed in the filming control area, such as the icon on the left of the filming control key in FIG. 3(b), and the edit key is also displayed, such as the icon on the right of the filming control key in FIG. 3(b). In response to detecting that the user performs a press-slide operation from the filming control key to the filming delete key and stops the press operation at the location of the filming delete key before the filming progress bar is completely filled, the filming delete key is modified into a selected state, for example, the icon becomes larger and its color changes to red, the current filmed video is deleted, and return to the filming interface shown in FIG. 1(e) for re-filming. In response to detecting that the user performs a press-slide operation from the filming control key to the edit key and stops the press operation at the location of the edit key, the edit key is modified into a selected state, for example, the icon becomes larger and its color changes to white, indicating that the user needs to edit the current filmed video. In response to detecting that the user performs a press-slide operation from the filming control key to the framing area, the zooming processing is performed on the current filmed video. For example, in the framing area, the filmed video is zoomed in when the press-slide operation is upward, and the filmed video is zoomed out when the press-slide operation is downward.

In step 306, the filmed video is shared with the designated user through a conversation message.

It is to be noted that in the press-to-film filming process, the filmed video may be sent in various manners. In the filming process, a control key on the filming interface may be used as a sending key. In response to determining that the duration of the filmed video does not exceed the preset duration, for example, if the duration of the filmed video is 15 seconds while the preset duration is 30 seconds, in response to detecting that the user stops pressing the filming control key, a sending instruction is triggered, and the filmed video is sent to the designated user for sharing. In response to determining that the duration of the filmed video exceeds the preset duration, the filmed video with a duration of 30 seconds is automatically sent to the designated user. The sending manner is not limited in this embodiment.

In this embodiment of the present disclosure, the video filming can be initiated directly through the long press operation, the collected voice information is automatically added to the video in the form of a subtitle in the filming process, and the filmed video is shared with the designated user through the conversation message. In this manner, the filming and sharing process of the short video becomes simple to operate, the filmed video has better performance, and the user can quickly and effectively complete the sharing process of the filmed video, thereby greatly improving the experience of the user.

Embodiment Four

Figure 4A:
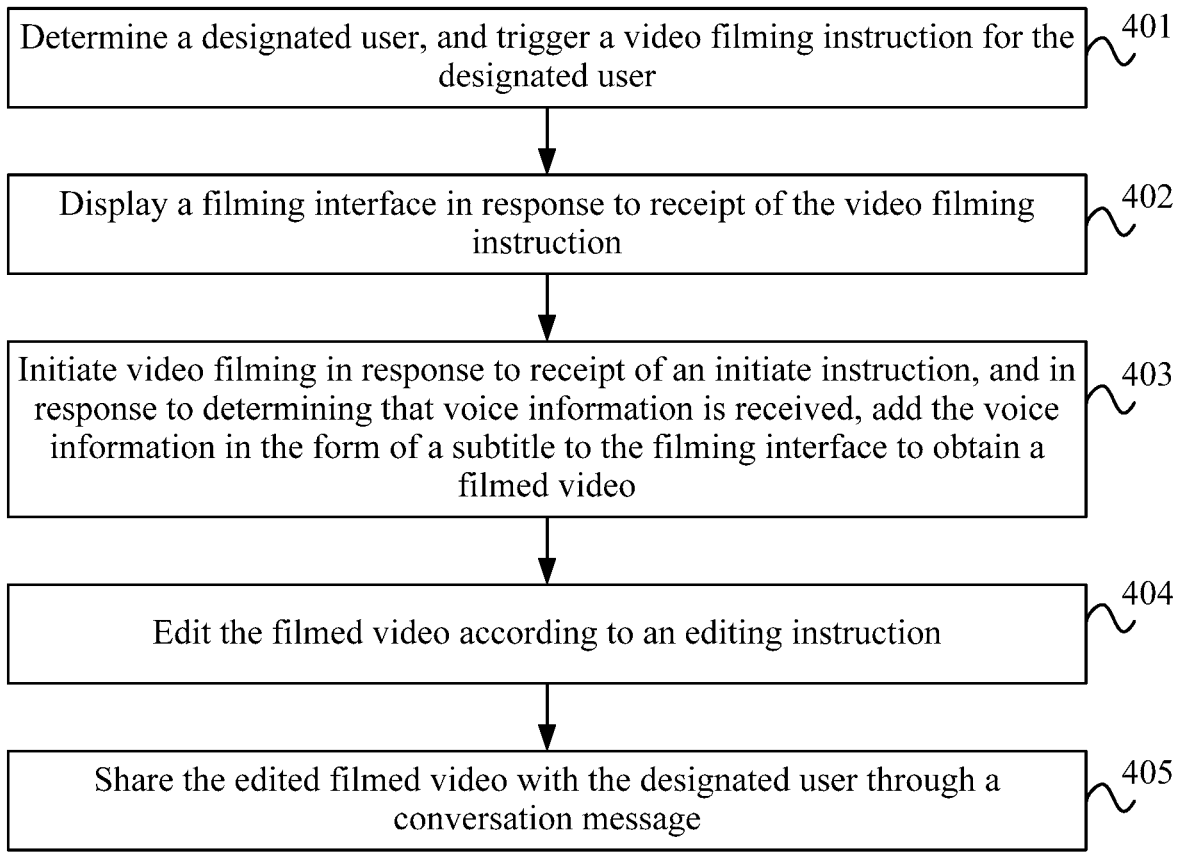
FIG. 4(a) is a flowchart of a video sharing method according to embodiment four of the present disclosure.

FIG. 4(a) is a flowchart of a video sharing method according to this embodiment of the present disclosure. This embodiment of the present disclosure may be combined with various optional schemes in the above embodiments. In this embodiment, with respect to embodiment one, before the filmed video is shared with the designated user, the video sharing method further includes the following step: the filmed video is edited according to an editing instruction.

As shown in FIG. 4(a), the method in this embodiment of the present disclosure includes steps 401 to 405.

In step 401, a designated user is determined, and a video filming instruction is triggered for the designated user.

In step 402, a filming interface is displayed in response to the receipt of the video filming instruction.

In step 403, video filming is initiated in response to the receipt of an initiate instruction, and in response to determining that voice information is received, the voice information is added in the form of a subtitle to the filming interface to obtain a filmed video.

In step 404, the filmed video is edited according to an editing instruction.

Optionally, the editing interface includes a video display area, an edit control area, and an edit menu area.

The video display area displays the filmed video according to a specified adaptation ratio. The edit menu area includes a subtitle control key, a text control key, and a brush control key. The edit control area includes an edit delete key, an only-show-once control key, and a sending key.

Optionally after the current filmed video is displayed on the editing interface, the method further includes the following steps: in response to a turn-off operation of the user on the subtitle control key, a subtitle added to the filmed video is deleted; in response to a turn-on operation of the user on the text control key, a text adding interface is displayed to allow the user to add text to the filmed video on the text adding interface; in response to a turn-on operation of the user on the brush control key, a brush adding interface is displayed to allow the user to draw on the filmed video on the brush adding interface; and in response to a state modifying operation of the user on the only-show-once control key, the number of times the designated user watches the filmed video is determined according to the modified state.

Figure 4B:
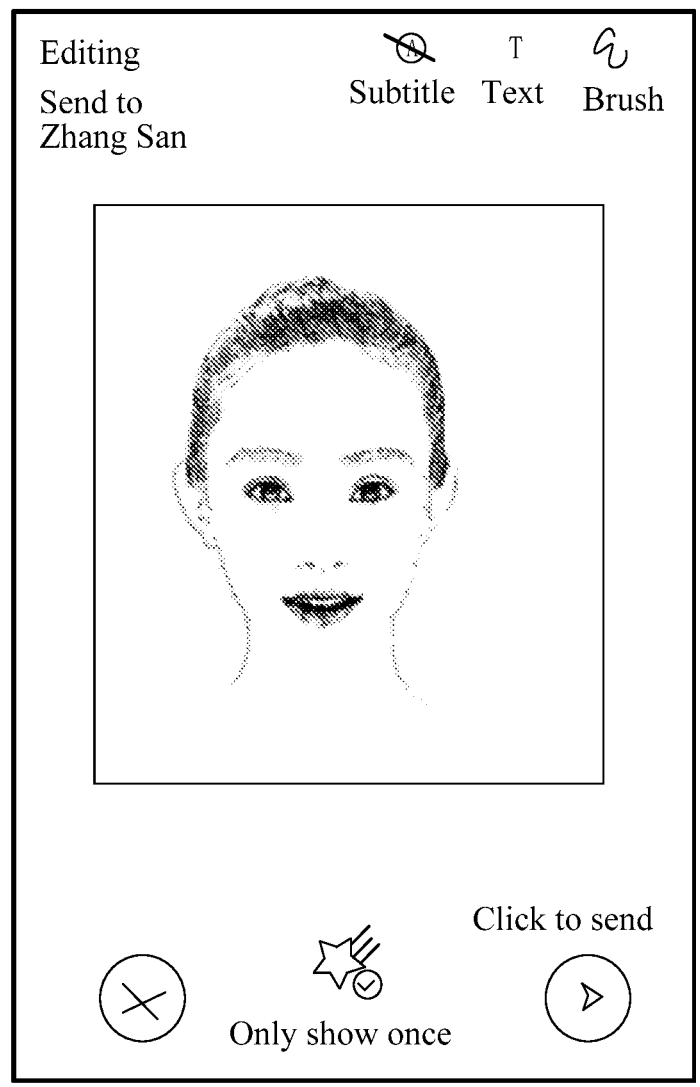
FIG. 4(b) is a schematic diagram of an editing interface where a subtitle control key is off according to embodiment four of the present disclosure.

For example, as shown in FIG. 4(b) which is a schematic diagram of an editing interface where the subtitle control key is off according to this embodiment of the present disclosure, In a case where the subtitle control key is on before filming, the subtitle displayed in the video can be deleted by turning off the subtitle control key on the editing interface, but in a case where the subtitle control key is off before filming, the text corresponding to the voice received during filming can be displayed in the filmed video as a whole by turning on the subtitle control key on the editing interface.

Figure 4C:
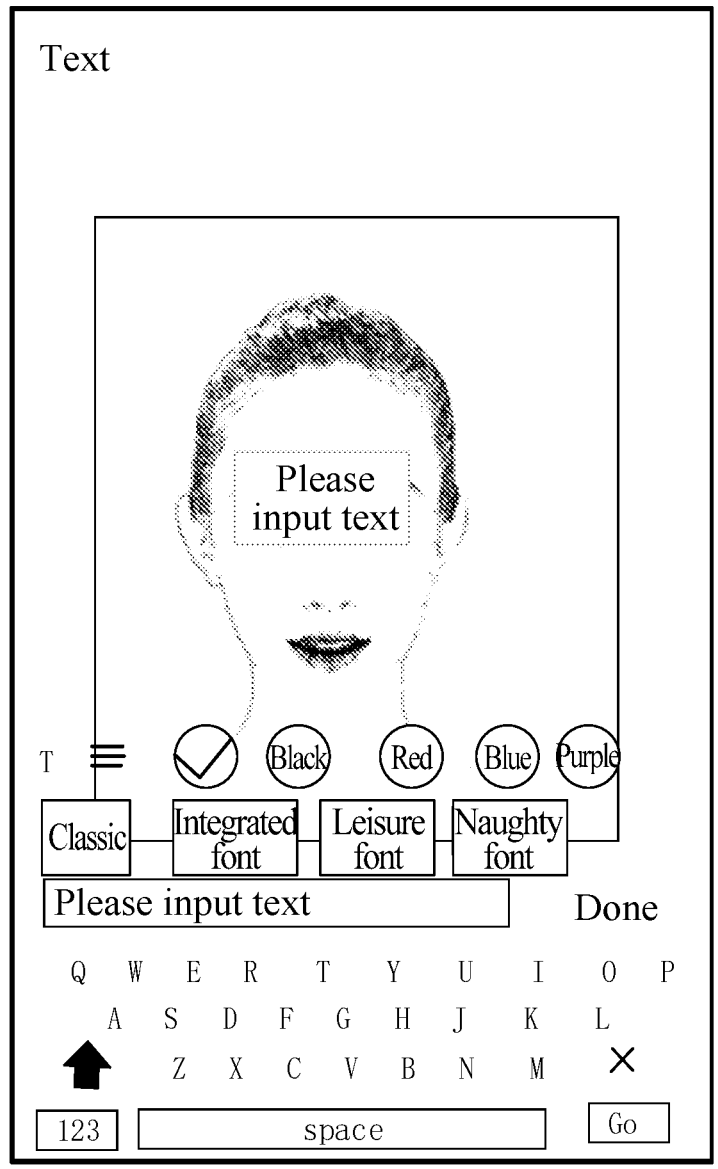
FIG. 4(c) is a schematic diagram of an editing interface where text editing is performed on a filmed video according to embodiment four of the present disclosure.
Figure 4D:
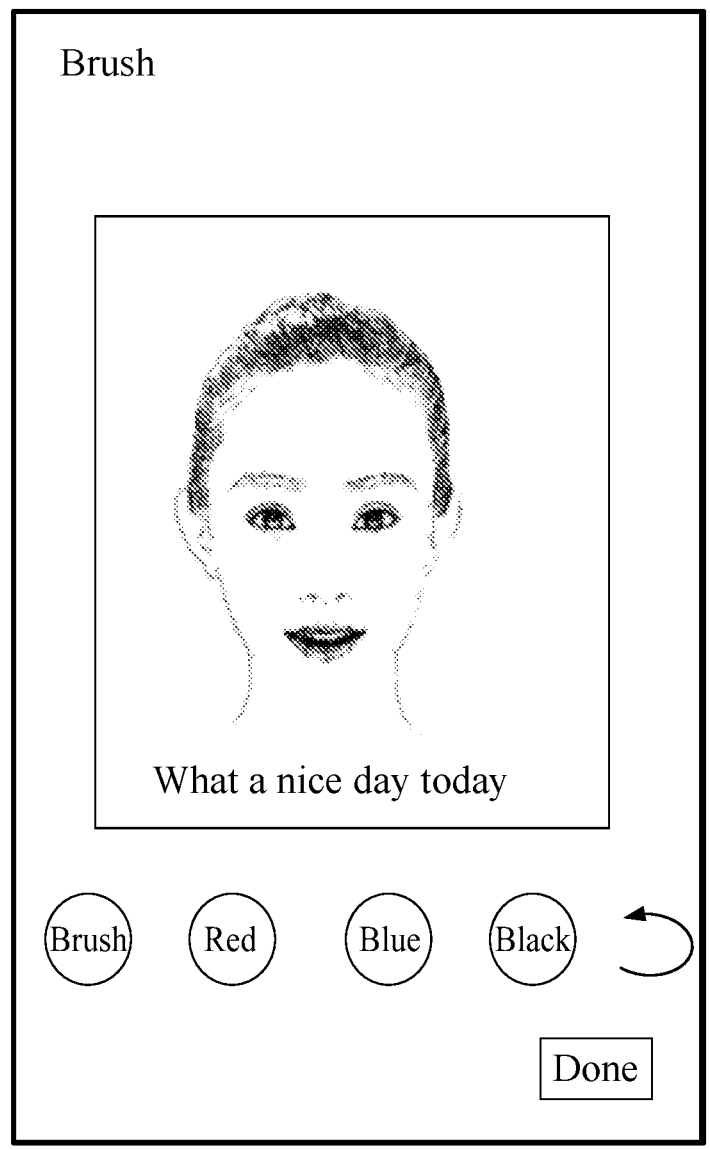
FIG. 4(d) is a schematic diagram of an editing interface where drawing is performed on a filmed video according to embodiment four of the present disclosure.

It is to be noted that the user may also turn on the text control key and the brush control key according to the demand to manually add text to the filmed video or manually draw. As shown in FIG. 4(c) which is a schematic diagram of an editing interface where text editing is performed on the filmed video when the text control key is on, the user may select a font and a color on the interface to add the desired text to the filmed video; as shown in FIG. 4(d) which is a schematic diagram of an editing interface where drawing is performed on the filmed video after the brush control key is on, the user can select the color of the brush on the interface to add the desired picture to the filmed video. The only-show-once control key is re-displayed on the editing interface, the user can modify the state of this control key according to the demand to determine the number of times the designated user watches the filmed video according to the modified state.

In step 405, the edited filmed video is shared with the designated user through a conversation message.

In this embodiment of the present disclosure, the video filming can be initiated directly through the long press operation or the trigger of voice information, the collected voice information is automatically added to the video in the form of a subtitle in the filming process, and the filmed video is shared with the designated user through the conversation message. In this manner, the filming and sharing process of the short video becomes simple to operate, the filmed video has better performance, and the user can quickly and effectively complete the sharing process of the filmed video, thereby greatly improving the experience of the user. In this embodiment, before the filmed video is sent, the filmed video can be edited according to the demand to satisfy the different needs of the user, thereby improving the experience of the user.

Embodiment Five

Figure 5:
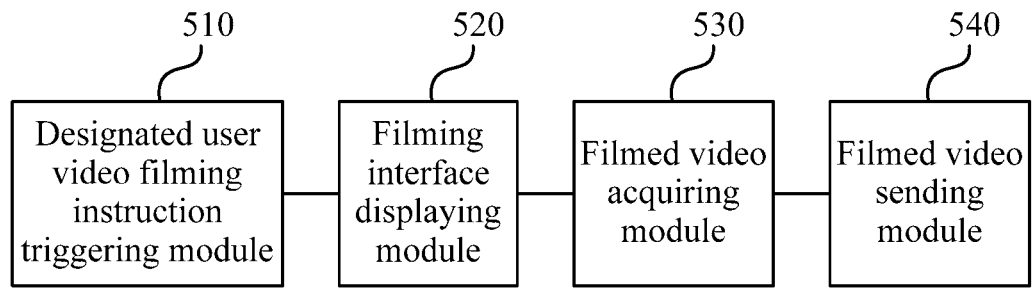
FIG. 5 is a structure diagram of a video sharing apparatus according to embodiment five of the present disclosure.

FIG. 5 is a structure diagram of a video sharing apparatus according to this embodiment of the present disclosure. This apparatus may be implemented in software and/or hardware and may generally be integrated into an electronic device that performs the method. As shown in FIG. 5, the apparatus may include a designated user video filming instruction triggering module 510, a filming interface displaying module 520, a filmed video acquiring module 530, and a filmed video sending module 540.

The designated user video filming instruction triggering module 510 is configured to determine a designated user and trigger a video filming instruction for the designated user.

The filming interface displaying module 520 is configured to display a filming interface in response to the receipt of the video filming instruction.

The filmed video acquiring module 530 is configured to initiate video filming in response to the receipt of an initiate instruction, and in response to determining that voice information is received, add the voice information in the form of a subtitle to the filming interface to obtain a filmed video, where the initiate instruction includes a long press operation or voice information.

The filmed video sending module 540 is configured to share the filmed video with the designated user through a conversation message.

Optionally, the designated user video filming instruction triggering module determines the designated user and triggers the video filming instruction for the designated user in one of the following manners.

In response to detecting a click operation of a user on a chat list interface for a filming identification of the designated user, the video filming instruction is triggered, where the chat list interface includes at least one user, and each user corresponds to one filming identification, respectively.

In response to detecting a click operation of a user on a conversation interface with the designated user for a filming identification, the video filming instruction is triggered.

In response to detecting an up-sliding operation of a user on a conversation interface with the designated user, the video filming instruction is triggered, where the sliding distance of the up-sliding operation exceeds a distance threshold.

Optionally, the filming interface includes a framing area, and the framing area displays a scene to be filmed at a specified adaptation ratio.

Optionally, the filming interface further includes a speak-to-film control key and a subtitle control key.

The filmed video acquiring module initiates the video filming in response to the receipt of the initiate instruction and in response to determining that the voice information is received, adds the voice information in the form of a subtitle to the filming interface to obtain the filmed video in the following manner. In response to determining that the speak-to-film control key is on and that the voice information is received, filming is initiated, and a filming progress bar is displayed on the filming interface, where the filming progress bar is used for performing a countdown on a filming duration based on a preset duration.

Text recognition is performed on the voice information, and in response to determining that the subtitle control key is on, text corresponding to the voice information is displayed in the form of a subtitle on the filming interface in real time.

In response to determining that the voice information is not received within a preset time range or that the filming duration reaches the preset duration, filming is stopped to obtain the filmed video.

Optionally, the filming interface further includes a filming control key and a subtitle control key.

The filmed video acquiring module initiates the video filming in response to the receipt of the initiate instruction and in response to determining that the voice information is received, adds the voice information in the form of a subtitle to the filming interface to obtain the filmed video in the following manner. In response to determining that a long press operation of a user on the filming control key is received, filming is initiated, and a filming progress bar is displayed on the filming interface, where the filming progress bar is used for performing a countdown on a filming duration based on a preset duration.

In response to determining that voice information is received during the long press operation, text recognition is performed on the voice information, and in response to determining that the subtitle control key is on, text corresponding to the voice information is displayed in the form of a subtitle on the filming interface in real time.

In response to determining that the long press operation of the user on the filming control key ends or that the filming duration reaches the preset duration, filming is stopped to obtain the filmed video.

Optionally, the video sharing apparatus further includes a filming delete key-edit key display module and a first processing module. The filming delete key-edit key display module is configured to display a filming delete key and an edit key on the filming interface.

The first processing module is configured to, in response to detecting that a user performs a press-slide operation from the filming control key to the filming delete key and stops the press operation at the location of the filming delete key, delete a current filmed video, and return to the filming interface; in response to detecting that the user performs a press-slide operation from the filming control key to the edit key and stops a pressing operation at a location of the edit key, display the current filmed video on an editing interface; and in response to detecting that the user performs a press-slide operation from the filming control key to the framing area, perform zooming processing on the current filmed video.

Optionally, the video sharing apparatus further includes a filming delete key-edit key display module and a second processing module. The filming delete key-edit key display module is configured to display a filming delete key and an edit key on the filming interface.

The second processing module is configured to, in response to detecting a click operation of a user on the filming delete key, delete a current filmed video, and return to the filming interface; in response to detecting a click operation of the user on the edit key, display the current filmed video on an editing interface; and in response to detecting a distance scaling operation of two fingers of the user in the framing area, perform zooming processing on the current filmed video.

Optionally, the editing interface includes a video display area, and the video display area displays the filmed video according to a specified adaptation ratio.

Optionally, the editing interface further includes a subtitle control key, a text control key, a brush control key, and an only-show-once control key.

The video sharing apparatus further includes an editing module.

The editing module is configured to, in response to a turn-off operation of a user on the subtitle control key, delete a subtitle added to the filmed video; in response to a turn-on operation of the user on the text control key, display a text adding interface to allow the user to add text to the filmed video on the text adding interface; in response to a turn-on operation of the user on the brush control key, display a brush adding interface to allow the user to draw on the filmed video on the brush adding interface; and in response to a state modifying operation of the user on the only-show-once control key, determine the number of times the designated user watches the filmed video according to a modified state.

Optionally, the filmed video sending module shares the filmed video with the designated user through the conversation message in the following manner.

In response to determining that the duration of the filmed video does not exceed the preset duration and that a sending instruction is received, the filmed video is sent to the designated user for sharing; and in response to determining that the duration of the filmed video exceeds the preset duration, the filmed video is automatically sent to the designated user for sharing.

Optionally, the sending instruction is generated when a user clicks a sending key.

Alternatively, the sending instruction is generated when a user releases the filming control key.

In this embodiment of the present disclosure, the video filming can be initiated directly through the long press operation or the trigger of voice information, the collected voice information is automatically added to the video in the form of a subtitle in the filming process, and the filmed video is shared with the designated user through the conversation message. In this manner, the filming and sharing process of the short video becomes simple to operate, the filmed video has better performance, and the user can quickly and effectively complete the sharing process of the filmed video, thereby greatly improving the experience of the user.

Embodiment Six

Figure 6:
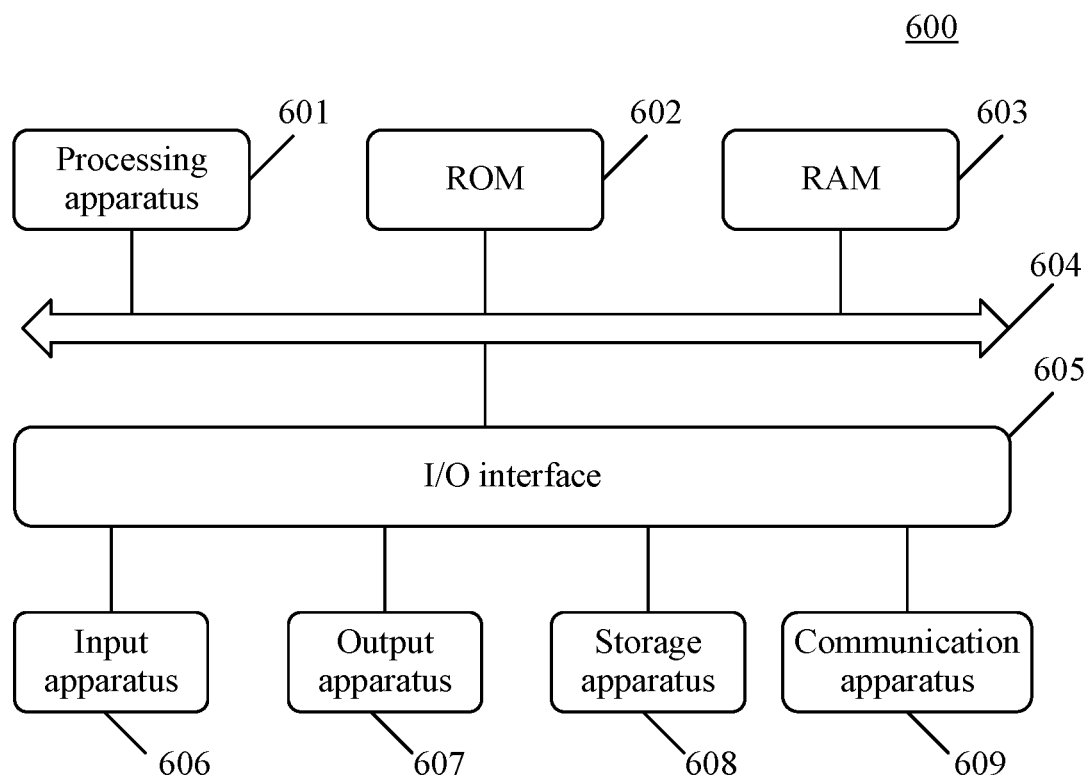
FIG. 6 is a structure diagram of an electronic device according to embodiment six of the present disclosure.

With reference to FIG. 6, FIG. 6 is a structure diagram of an electronic device 600 suitable for implementing embodiments of the present disclosure. The electronic device in this embodiment of the present disclosure may be a device corresponding to the back-end service platform of an application program, and may also be a mobile terminal device with an application program client installed. For example, the electronic device may include, but is not limited to, a mobile terminal such as a mobile phone, a laptop, a digital broadcast receiver, a personal digital assistant (PDA), a portable android device (PAD), a portable media player (PMP) and a vehicle-mounted terminal (such as a vehicle-mounted navigation terminal) and a fixed terminal such as a digital television (TV) and a desktop computer. The electronic device shown in FIG. 6 is an example and is not intended to limit the function and usage scope of the embodiments of the present disclosure.

As shown in FIG. 6, the electronic device 600 may include a processing apparatus 601 (such as a central processing unit and a graphics processing unit). The processing apparatus 601 may perform various types of suitable operations and processing based on a program stored in a read-only memory (ROM) 602 or a program loaded from a storage apparatus 608 to a random-access memory (RAM) 603. In the RAM 603, various programs and data required for the operation of the electronic device 600 are also stored. The processing apparatus 601, the ROM 602, and the RAM 603 are connected to each other via a bus 604. An input/output (I/O) interface 605 is also connected to the bus 604.

Generally, the following apparatus may be connected to the I/O interface 605: an input apparatus 606 such as a touch screen, a touchpad, a keyboard, a mouse, a camera, a microphone, an accelerometer and a gyroscope; an output apparatus 607 such as a liquid-crystal display (LCD), a speaker and a vibrator; the storage apparatus 608 such as a magnetic tape and a hard disk; and a communication apparatus 609. The communication apparatus 609 may allow the electronic device 600 to perform wireless or wired communication with other devices to exchange data. Although FIG. 6 shows the electronic device 600 having various apparatuses, it is to be understood that not all the apparatuses shown here need to be implemented or present. Alternatively, more or fewer apparatuses may be implemented or present.

Particularly, according to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded and installed from a network through the communication apparatus 609, may be installed from the storage apparatus 608, or may be installed from the ROM 602. When the computer program is executed by the processing apparatus 601, the preceding functions defined in the method of any embodiment of the present disclosure are executed.

It is to be noted that the preceding computer-readable medium in the present disclosure may be a computer-readable signal medium, a computer-readable storage medium or any combination thereof. The computer-readable storage medium may include, but is not limited to, an electronic, magnetic, optical, electromagnetic, infrared, or semiconductor system, apparatus, or device, or any suitable combination thereof. Specific examples of the computer-readable storage medium may include, but are not limited to, an electrical connection having at least one wire, a portable computer disk, a hard disk, a RAM, a ROM, an erasable programmable read-only memory (EPROM, or a flash memory), an optical fiber, a portable compact disc read-only memory (CD-ROM), an optical storage device, a magnetic storage device, or any suitable combination thereof. In the present disclosure, the computer-readable storage medium may be any tangible medium that can contain, or store a program for use by or in connection with an instruction execution system, apparatus, or device. In the present disclosure, the computer-readable signal medium may include a propagated data signal with computer-readable program code embodied therein, for example, in baseband or as part of a carrier wave. Such a propagated data signal may take any of a variety of forms, including, but not limited to, electro-magnetic, optical, or any suitable combination thereof. The computer-readable signal medium may be any computer-readable medium that is not a computer-readable storage medium and that can communicate, propagate, or transport a program for use by or in connection with an instruction execution system, apparatus, or device. The program codes included on the computer-readable medium may be transmitted via any suitable medium which includes, but is not limited to, a wire, an optical cable, a radio frequency (RF), or any suitable combination thereof.

In some embodiments, clients and servers may communicate using any currently known network protocol such as HyperText Transfer Protocol (HTTP) or any network protocol to be developed in the future, and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any network currently known or to be developed in the future.

The computer-readable medium may be included in the electronic device or may exist alone without being assembled into the electronic device.

The computer-readable medium carries at least one program, where the at least one program, when executed by the electronic device, enables the internal process of the electronic device to perform the following operations: a designated user is determined, and a video filming instruction is triggered for the designated user; a filming interface is displayed in response to the receipt of the video filming instruction; video filming is initiated in response to the receipt of an initiate instruction, and in response to determining that voice information is received, the voice information is added in the form of a subtitle to the filming interface to obtain a filmed video, where the initiate instruction includes a long press operation or voice information; and the filmed video is shared with the designated user through a conversation message.

Computer program codes for performing the operations in the present disclosure may be written in one or more programming languages or combinations thereof. The preceding one or more programming languages include, but are not limited to, object-oriented programming languages such as Java, Smalltalk and C++, and conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relate to the remote computer, the remote computer may be connected to the user computer via any kind of network including a LAN or a WAN, or may be connected to an external computer (for example, via the Internet through an Internet service provider).

The flowcharts and block diagrams in the drawings show the possible architectures, functions and operations of the system, method and computer program product according to various embodiments of the present disclosure. In this regard, each block in the flowcharts or block diagrams may represent a module, a program segment, or part of codes that contains at least one executable instruction for implementing specified logical functions. It is also to be noted that in some alternative implementations, the functions marked in the blocks may occur in an order different from those marked in the drawings. For example, two blocks shown in succession may, in fact, be executed substantially concurrently, or the blocks may sometimes be executed in the reverse order, depending upon the functionality involved. It is also to be noted that each block in the block diagrams and/or flowcharts and combinations of blocks in the block diagrams and/or flowcharts may be implemented by special-purpose hardware-based systems that perform the specified functions or operations, or combinations of special-purpose hardware and computer instructions.

The units involved in the embodiments of the present disclosure may be implemented by software or hardware. The name of a unit is not intended to limit the unit in a certain circumstance.

The functions described above herein may be executed, at least partially, by at least one hardware logic component. For example, without limitation, exemplary types of hardware logic components that may be used include: a field-programmable gate array (FPGA), an application-specific integrated circuit (ASIC), application-specific standard parts (ASSP), a system on a chip (SOC), a complex programmable logic device (CPLD), and the like.

In the context of the present disclosure, the machine-readable medium may be a tangible medium that may include or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Specific examples of the machine-readable storage medium may include an electrical connection having at least one wire, a portable computer disk, a hard disk, a RAM, a ROM, an EPROM or a flash memory, an optical fiber, a portable CD-ROM, an optical storage device, a magnetic storage device, or any suitable combination thereof.

The preceding description is only optional embodiments of the present disclosure and an illustration of the technical principle as exerted. Those skilled in the art should understand that the scope of invention in the present disclosure is not limited to the technical solution resulting from a specific combination of the technical features, and meanwhile, should also cover other technical solutions resulting from any combination of the technical features or their equivalent features without departing from the inventive concept. For example, the other technical solutions may be technical solutions formed by mutual substitutions between the technical features described above and the technical features that are disclosed in the present disclosure and (may not necessarily) have similar functions.

In addition, although various operations are depicted in a particular order, this should not be understood as requiring that such operations be performed in the particular order shown or in a sequential order. In certain circumstances, multitasking and parallel processing may be advantageous. Similarly, although specific implementation details are included in the above discussion, these should not be construed as limiting the scope of the present disclosure. Some features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Conversely, the specific features and acts described above are merely example forms of implementing the claims.

What is claimed is:

1. A video sharing method, comprising:
    determining a designated user, and triggering a video filming instruction for the designated user;
    displaying a filming interface in response to receipt of the video filming instruction;
    initiating video filming in response to receipt of an initiate instruction, and in response to determining that voice information is received, adding the voice information in a form of a subtitle to the filming interface to obtain a filmed video, wherein the initiate instruction comprises a long press operation or voice information; and
    sharing the filmed video with the designated user through a conversation message;
    wherein the filming interface comprises a framing area, a speak-to-film control key and a subtitle control key, and the framing area displays a scene to be filmed at a specified adaptation ratio; and
    wherein the initiating video filming in response to receipt of an initiate instruction and in response to determining that voice information is received, adding the voice information in a form of a subtitle to the filming interface to obtain a filmed video comprises:
    in response to determining that the speak-to-film control key is on and that the voice information is received, initiating filming, and displaying a filming progress bar on the filming interface, wherein the filming progress bar is used for performing a countdown on a filming duration based on a preset duration;
    performing text recognition on the voice information, and in response to determining that the subtitle control key is on, displaying text corresponding to the voice information in the form of a subtitle on the filming interface in real time; and
    in response to determining that the voice information is not received within a preset time range or that the filming duration reaches the preset duration, stopping filming to obtain the filmed video.

2. The method according to claim 1, wherein the determining a designated user and triggering a video filming instruction for the designated user comprises:
    in response to detecting a click operation of a user on a chat list interface for a filming identification of the designated user, triggering the video filming instruction, wherein the chat list interface comprises at least one user, and each of the at least one user corresponds to a filming identification, respectively; or
    in response to detecting a click operation of a user on a conversation interface with the designated user for a filming identification, triggering the video filming instruction; or
    in response to detecting an up-sliding operation of a user on a conversation interface with the designated user, triggering the video filming instruction, wherein a sliding distance of the up-sliding operation exceeds a distance threshold.

3. The method according to claim 1, after the in response to determining that the speak-to-film control key is on and that the voice information is received, initiating filming and displaying a filming progress bar on the filming interface, further comprising:
    displaying a filming delete key and an edit key on the filming interface;
    in response to detecting a click operation of a user on the filming delete key, deleting a current filmed video, and returning to the filming interface;
    in response to detecting a click operation of the user on the edit key, displaying a current filmed video on an editing interface; and
    in response to detecting a distance scaling operation of two fingers of the user in the framing area, performing zooming processing on a current filmed video.

4. The method according to claim 3, wherein the editing interface comprises a video display area, and the video display area displays the filmed video according to a specified adaptation ratio.

5. The method according to claim 4, wherein the editing interface further comprises a subtitle control key, a text control key, a brush control key, and an only-show-once control key; and wherein after the displaying the current filmed video on an editing interface, the method further comprises:
in response to a turn-off operation of a user on the subtitle control key, deleting a subtitle added to the filmed video;
in response to a turn-on operation of the user on the text control key, displaying a text adding interface to allow the user to add text to the filmed video on the text adding interface;
in response to a turn-on operation of the user on the brush control key, displaying a brush adding interface to allow the user to draw on the filmed video on the brush adding interface; and
in response to a state modifying operation of the user on the only-show-once control key, determining a number of times the designated user watches the filmed video according to a modified state.

6. The method according to claim 1, wherein the sharing the filmed video with the designated user through a conversation message comprises:
in response to determining that a duration of the filmed video does not exceed the preset duration and that a sending instruction is received, sending the filmed video to the designated user through the conversation message for sharing; and
in response to determining that the duration of the filmed video exceeds the preset duration, automatically sending the filmed video to the designated user through the conversation message for sharing.

7. The method according to claim 6, wherein the sending instruction is generated when a user clicks a sending key; or
the sending instruction is generated when a user releases the filming control key.

8. A non-transitory computer-readable storage medium storing a computer program, wherein the computer program, when executed by a processor, performs the method according to claim 1.

9. A video sharing method, comprising:
determining a designated user, and triggering a video filming instruction for the designated user;
displaying a filming interface in response to receipt of the video filming instruction;
initiating video filming in response to receipt of an initiate instruction, and in response to determining that voice information is received, adding the voice information in a form of a subtitle to the filming interface to obtain a filmed video, wherein the initiate instruction comprises a long press operation or voice information; and
sharing the filmed video with the designated user through a conversation message;
wherein the filming interface comprises a framing area, a filming control key and a subtitle control key, and the framing area displays a scene to be filmed at a specific adaptation ratio; and
wherein the initiating video filming in response to receipt of an initiate instruction and in response to determining that voice information is received, adding the voice information in a form of a subtitle to the filming interface to obtain a filmed video comprises:
in response to determining that a long press operation of a user on the filming control key is received, initiating filming, and displaying a filming progress bar on the filming interface, wherein the filming progress bar is used for performing a countdown on a filming duration based on a preset duration;
in response to determining that the voice information is received during the long press operation, performing text recognition on the voice information, and in response to determining that the subtitle control key is on, displaying text corresponding to the voice information in the form of a subtitle on the filming interface in real time; and
in response to determining that the long press operation of the user on the filming control key ends or that the filming duration reaches the preset duration, stopping filming to obtain the filmed video.

10. The method according to claim 9, after the in response to determining that a long press operation of a user on the filming control key is received, initiating filming and displaying a filming progress bar on the filming interface, further comprising:
displaying a filming delete key and an edit key on the filming interface;
in response to detecting that a user performs a press-slide operation from the filming control key to the filming delete key and stops a pressing operation at a location of the filming delete key, deleting a current filmed video, and returning to the filming interface;
in response to detecting that the user performs a press-slide operation from the filming control key to the edit key and stops a pressing operation at a location of the edit key, displaying a current filmed video on an editing interface; and
in response to detecting that the user performs a press-slide operation from the filming control key to the framing area, performing zooming processing on a current filmed video.

11. An electronic device, comprising:
at least one processor; and
a storage apparatus, configured to store at least one program;
wherein the at least one program, when executed by the at least one processor, cause the one or more processors to implement:
determining a designated user, and triggering a video filming instruction for the designated user;
displaying a filming interface in response to receipt of the video filming instruction;
initiating video filming in response to receipt of an initiate instruction, and in response to determining that voice information is received, adding the voice information in a form of a subtitle to the filming interface to obtain a filmed video, wherein the initiate instruction comprises a long press operation or voice information; and
sharing the filmed video with the designated user through a conversation message;
wherein the filming interface comprises a framing area, a speak-to-film control key and a subtitle control key, and the framing area displays a scene to be filmed at a specified adaptation ratio; and
wherein the initiating video filming in response to receipt of an initiate instruction and in response to determining that voice information is received, adding the voice information in a form of a subtitle to the filming interface to obtain a filmed video comprises:
in response to determining that the speak-to-film control key is on and that the voice information is received, initiating filming, and displaying a filming progress bar on the filming interface, wherein the filming progress bar is used for performing a countdown on a filming duration based on a preset duration;
performing text recognition on the voice information, and in response to determining that the subtitle control key is on, displaying text corresponding to the voice information in the form of a subtitle on the filming interface in real time; and in response to determining that the voice information is not received within a preset time range or that the filming duration reaches the preset duration, stopping filming to obtain the filmed video.

12. The electronic device according to claim 11, wherein the at least one program, when executed by the at least one processor, cause the one or more processors to implement:

in response to detecting a click operation of a user on a chat list interface for a filming identification of the designated user, triggering the video filming instruction, wherein the chat list interface comprises at least one user, and each of the at least one user corresponds to a filming identification, respectively; or in response to detecting a click operation of a user on a conversation interface with the designated user for a filming identification, triggering the video filming instruction; or in response to detecting an up-sliding operation of a user on a conversation interface with the designated user, triggering the video filming instruction, wherein a sliding distance of the up-sliding operation exceeds a distance threshold.

13. The electronic device according to claim 11, wherein the at least one program, when executed by the at least one processor, cause the one or more processors to implement:

displaying a filming delete key and an edit key on the filming interface;

in response to detecting a click operation of a user on the filming delete key, deleting a current filmed video, and returning to the filming interface;

in response to detecting a click operation of the user on the edit key, displaying a current filmed video on an editing interface; and in response to detecting a distance scaling operation of two fingers of the user in the framing area, performing zooming processing on a current filmed video.

14. The electronic device according to claim 13, wherein the editing interface comprises a video display area, and the video display area displays the filmed video according to a specified adaptation ratio.

* * * * *